May 6, 1969 J. R. CIELO 3,443,194
DC-TO-DC CONVERTER WITH CONTINUOUS FEED TO THE LOAD
Filed Sept. 14, 1967 Sheet 1 of 2
FIG. 1
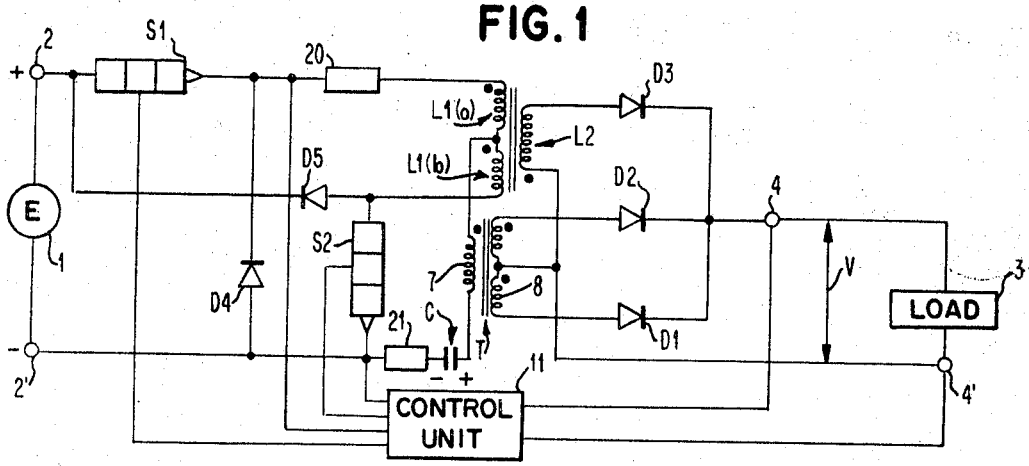
FIG. 2(a) $i_{S1}$ 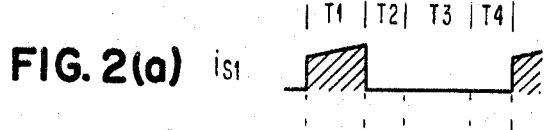
FIG. 2(b) $i_{S2}$ 
FIG. 2(c) $i_{L1(a)}$ 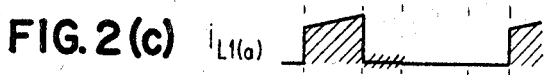
FIG. 2(d) $i_{L1(b)}$ 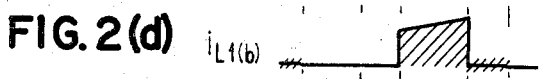
FIG. 2(e) $i_{L2}/N$, $i_{D3}/N$ 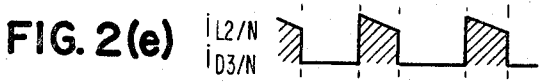
FIG. 2(f) $i_7$, $i_C = i_7$ 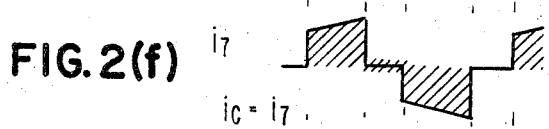
FIG. 2(g) $i_{D3}$ 
FIG. 2(h) $i_{D2}$ 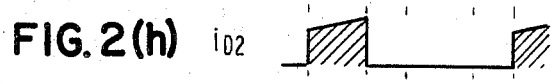
FIG. 2(i) $i_{D1}$ 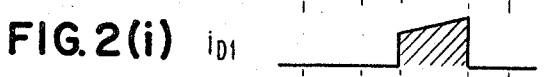
FIG. 2(J) $I/N$ 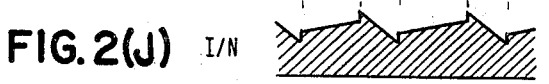
FIG. 3
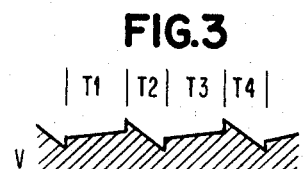
INVENTOR
JOHN R. CIELO
BY David E. Lovejoy
AGENT United States Patent Office 3,443,194
Patented May 6, 1969

3,443,194
DC-TO-DC CONVERTER WITH CONTINUOUS
FEED TO THE LOAD
John R. Cielo, Kingston, N.Y., assignor to International
Business Machines Corporation, Armonk, N.Y., a corporation of New York
Filed Sept. 14, 1967, Ser. No. 667,698
Int. Cl. H02m 3/32
U.S. Cl. 321—2
13 Claims

ABSTRACT OF THE DISCLOSURE

Disclosed are improved DC-to-DC converter circuits which have regulated output voltages to compensate for source and load variations. The regulation is achieved by controlling the ratio of the "ON" to "OFF" time of the power source and other power reservoirs. The converter features besides the "ORING" of power to the load, the inclusion of transient inhibiting inductors in series with the switching transistors and transformer primary whenever those transistors are conducting. The "ORING" of power to the load is achieved through the transient inhibiting inductors which act as storage reservoirs to store energy while power is being delivered through them from a source, through a transformer, and rectifier to a load and which supplies its stored energy to the load through an isolated winding when the power source is not delivering power to the load.

CROSS-REFERENCES TO RELATED APPLICATION

"DC-to-DC Converter With Continuous Feed to the Load." Inventors: Harry S. Hoffman, Hua-Tung Lee (Ser. No. 667,762 filed simultaneous with the present application).

BACKGROUND OF THE INVENTION

Many modern-day electronic machines require a regulated DC voltage for their operation. Often, the generation of such a DC voltage is achieved by converting a 290 volt DC (rectified 208 volt, 3ɸAC) level down to a lower level such as 3 volts DC. Of course, this example is just one of the many that are required in today's machines. Typical DC-to-DC converters for achieving such conversions contain 5 elements; namely, an inverter, a transformer, a rectifier, a DC filter, and a control.

The inverter, including a switching transistor or other source switch, serves to convert the input DC source voltage to a rectangular AC waveform which is in turn passed through a transformer to the secondary, rectified and filtered to obtain a DC output voltage.

In more detail, conventional converters have included a DC power source which is alternately connected and disconnected, through a source switch (e.g. transistor), to the primary windings of a transformer. When the source switch is on, the transformer directly couples power from the power source to the secondary where it is rectified, filtered and delivered to the load. Current reversing means are also provided to reverse the direction of current in the primary winding of the transformer. The current reversing means include a current-reversing switch (e.g. transistor) which is turned on during periods when the power source switch is turned off. Reversal of the current in the primary winding still delivers power to the load since the transformer secondary generally includes a split secondary winding (a center tapped winding) with each outer leg including a rectifying diode each feeding the load through the same load terminal and through the same filter.

The control portion of the system senses the output voltage and acts to control by turning the source switch and the current-reversing switch on and off, the ratio of the "ON" to "OFF" time of those switches thereby controlling the output voltage level.

Those typical prior art converters have presented a number of problems since they have been designed with a low primary impedance. With this low primary impedance, the failure of a component such as a shorted rectifier, saturated transformer, or shorted winding causes the primary current to increase so rapidly that the primary switching transistors are destroyed. Since those transistors are usually expensive their destruction, of course, should be avoided if possible.

A substantial modification to those typical converters is disclosed in the above mentioned copending application of Hoffman et al. That modification consists of placing a single reservoir (storage inductor) in the primary circuit between the power source and the transformer primary winding. That storage inductor stores energy when the power switch is on and delivers that energy through a coupling winding to the load when the power source switch is off. The inclusion of that storage inductor in the primary circuit provides a large impedance which prevents a rapid rise in primary current in the event a failure occurs in one or more of the primary components.

The Hoffman et al. invention, while significantly improving upon conventional DC-to-DC converters, does not fully protect the switching transistors since the primary storage inductor is not always in series with the primary winding of the transformer and a conducting switch; namely, the power source switch or the current-reversing switch. Accordingly, neither the conventional DC-to-DC converters nor the converter of the Hoffman et al. invention provide as full a fault protection as is desirable. Additionally, the conventional DC-to-DC converters have exhibited excessive ripple in the output voltage, V, particularly when the input voltage, E, has been greatly stepped down; that is, when the ratio $E/V$ is large. Although the Hoffman et al. invention improves upon those converters, still greater improvements are desirable.

In view of the above problems, it is an object of the present invention to provide an improved voltage converter which exhibits improved output voltage regulation, increased smoothness of operation and greater fault protection. These and other objects and advantages attendant the present invention are apparent from the summary and other descriptions which follow.

SUMMARY OF THE INVENTION

The improvement of the present invention includes the insertion of two storage inductors (or a double winding inductor) in the primary circuit of conventional DC-to-DC converters such that one inductor (or one winding) is always in series with a conducting switch and the transformer primary winding. The storage inductors store energy while the associated switch is on and deliver that energy, under the control of control means, through coupling means (e.g., a winding) to the load. Although the storage inductors operate through transformer action (flyback action) to deliver power to the load, the inductor functions independently from the transformer to deliver power to the load.

The two storage inductors are magnetically coupled through the same coupling means (e.g., through an inductor secondary winding and a diode) to a common load terminal and the load.

The inclusion of the two storage inductors (or double winding single inductor) in the primary circuit provides three important features, namely, fault protection, smoother operation, and filtering.

First, fault protection is provided for each of the switches in the primary circuit because a storage inductor is always in series with a conducting switch (and the particular power reservoir) and the transformer primary winding. Accordingly, the inclusion of this series inductor limits the rate in rise of fault current to allow a conventional fault current detector to disable the circuit operation through elimination of excessive current or primary circuit before the primary switches or other circuit components have been damaged.

Second, the present invention features smoother circuit operation through elimination of excessive current or voltage transients. This smoother operation is achieved because of the presence of the storage inductors and because those inductors are freely associated with either the primary circuit (current through the primary winding of the transformer to the load) or with the secondary circuit (current through the coupling means to the load). Accordingly, when current previously being conducted in the primary circuit is turned off by one of the primary switches, that current is freely transferred from the inductor primary to the inductor secondary in a relatively smooth manner.

Third, the present invention exhibits a filtering action resulting from the inclusion of a storage inductor in series with the transformer primary winding and the source of power driving current through that primary winding. By way of comparison, the Hoffman et al. circuit does not includes such a series relationship during all phases of its operation. Accordingly, the filtering action achieved by the series relationship of the primary winding and a storage inductor improves the output voltage regulation by insuring that voltage changes through the transformer will be relatively gradual rather than with large transients.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 1 depicts a hybrid, half-bridge converter circuit employing a double winding inductor L1 [having windings (a) and (b)] for storing and transferring power to the load in accordance with the present invention.

FIGS. 2(a) through 2(j) depict various current waveforms characteristic of the operation of the FIG. 1 circuit.

FIG. 3 depicts the output voltage waveform, V, characteristic of the operation of the FIG. 1 circuit.

DETAILED DESCRIPTION

Figure 4:
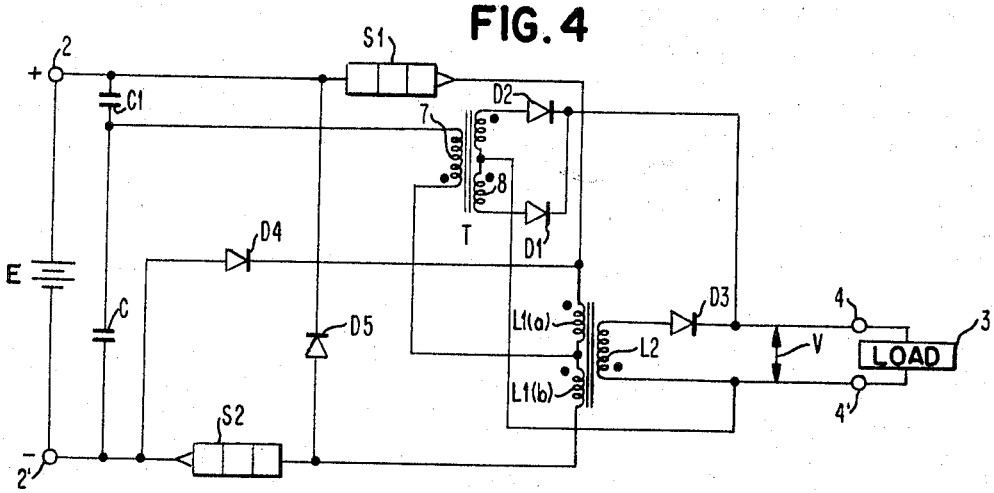
FIG. 4 is a half-bridge circuit employing a double winding inductor in accordance with the present invention.

As previously pointed out, the purpose of the circuit of this invention is to convert an input DC voltage, E, to a well-regulated DC output voltage, V, employing, but significantly improving upon, well known DC-to-DC converter techniques. It will, of course, be realized that an AC signal can be easily rectified to provide the type of unregulated DC input usually associated with DC-to-DC converters. Accordingly, this invention contemplates AC-to-DC conversion although the significant contribution of this invention is in the DC-to-DC portion of such an AC-to-DC converter.

With reference to FIG. 1, the input voltage, E, to be regulated and stepped down is supplied, by power source 1, to the input terminals 2–2' and the well regulated DC output, V, appears across the load 3 at output terminals 4–4'. The components designated in FIG. 1, FIG. 4, FIG. 5, and FIG. 6 are those conventionally found in the DC-to-DC converter technology and accordingly, no further description of them at this point is deemed necessary. Additionally, the interconnections of the various components will also be given in connection with a description of the circuit operation.

The operation of the FIG. 1 DC-to-DC converter is conveniently described with reference to four time periods. Those four time periods, T1, T2, T3 and T4, correspond to the sequential opening and closing times of the switches S1 and S2. Those time periods are shown throughout the waveforms of FIGURES 2 and in FIGURES 3. FIGURES 2(a) through 2(j) depict various currents passing through various components of the FIG. 1 circuit, those components being indicated by the appropriate component subscript (such as S1, L1, etc.), for the different time periods T1 through T4. For example, during the period T1, the current through the source switch S1 is given by $i_{S1}$ as shown in FIG. 2(a). Similarly, the current $i_{S2}$ is shown in FIG. 2(b) and which, as shown, is conducting only during the period T3. Corresponding to the current through the load as shown in FIG. 2(j) is the regulated output voltage, V, shown in FIG. 3.

In FIG. 1, switches S1 and S2 are shown as transistors but, of course, other well-known switches such as SCR's can be employed with their associated commutating networks. Switch S1 is designated as a source switch since it functions to connect the power source 1, through the windings, L1(a) of a storage inductor L1, to the primary winding 7 of the transformer T. The switch S2 is designated as a current-reversing switch and it is a part of a current-reversing means since, when it is conducting, it functions to allow the current to be reversed in the primary winding 7 of the transformer T.

OPERATION

With reference to FIG. 1 and FIG. 2, the first period of operation, T1, begins when switch S1 is turned on (conducting) while switch S2 remains off (non-conducting). Under those conditions, the source voltage E is impressed as an input signal across the simple series circuit composed of the storage inductor winding L1(a), the transformer primary winding 7, and the storage capacitor C. As indicated by the dot convention, the current in the transformer primary winding 7 induces a voltage in the transformer secondary winding 8 having a polarity which causes rectifying diode D2 to conduct a current through load terminal 4 to the load 3. The current in the S1, L1(a), winding 7 and C loop is depicted in the FIG. 2(a), FIG. 2(c), and FIG. 2(f) drawings. The current in the transformer secondary which passes through D2 is depicted in FIG. 2(h) and the corresponding current in the load is depicted in FIG. 2(j).

With diode D2 conducting, the other rectifying diode, D1, is reverse biased and therefore non-conducting. In a similar manner, the coupling winding L2, associated with inductor primary windings L1(a) and L1(b) in the manner indicated by the dot convention, reverse biases the coupling diode D3. With D3 reverse biased, the inductor secondary L2 is essentially opened-circuited and therefore inductor L1(a) acts merely as an inductor. The absence of current in the coupling means during the T1 period is indicated in FIG. 2(e). Accordingly, during the T1 period, the storage inductor L1(a) as well as the storage capacitor C is storing energy which will be transferred to the load at a subsequent time. Simultaneously, with this storage in the L1(a) and C reservoirs, the transformer T is delivering power through the forward biased diode D2 to the load 3 as shown in FIG. 2(h) and FIG. 2(j).

Besides the beneficial storing of energy for subsequent use, L1(a) and C also serve to reduce the voltage drop across the primary winding 7 because of the voltage-splitting, series relationship of L1(a), the primary of T, and C. As pointed out above, when a large reduction in the input voltage is desired at the output (that is, the ratio E/V is large), the voltage reduction contributed by the voltage drops across L1(a) and C significantly aids the overall reduction from E to V. It should be noted that this reduction contributed by the "storing" drops across L1(a) and C is non-dissipative in that the energy stored is subsequently used. Since it is non-dissipative, no problems such as undesirable heat generation are created.

It should also be noted that during the T1 period, S1 is a conducting transistor which has an inductor L1(a) in series therewith and, accordingly, the desired fault protection for that transistor is provided in accordance with one of the objects of the present invention.

Additionally, it should be noted that during the T1 period the inductor L1(a) is in series with the primary winding 7 through which power is being delivered to the load. In accordance with another object of the present invention, the inductor L1(a) therefore acts to help filter the power being transferred to the load through the transformer T.

Throughout the current waveforms shown in FIG. 2, the currents are depicted as exhibiting nearly linear rising or falling slopes as shown in FIG. 2(a) for the current through S1, for example. The nearly linear slopes for $i_{S1}$ and all other currents result from the fact that the appropriate time constants of the circuit are considerably larger than the corresponding phase durations and, hence, all of the waveforms may be considered as having linear time-function segments as shown. The basic operating frequency [that is, $1/(T1+T2+T3+T4)$] generally ranges from 30 to 100 kHz. depending upon the switching speeds of the transistors and rectifier diodes. There is no theoretical limitation, however, as to the frequencies at which the circuit may be operated.

Still referring to FIG. 1 and FIG. 2, the second period of operation T2 begins when the control unit 11 turns the source switch S1 off (switch S2 still remaining off). With both S1 and S2 off, and with the storage inductor L1 and the storage capacitor C having energy stored therein, both L1 and C attempt to discharge their energy. Since there is no discharge current path through C with S1 and S2 non-conducting because diode D4 conducts only in the direction opposite to the discharge direction of C, C cannot discharge. The energy stored in L1 reservoir may be discharged, however, through the coupling winding L2 and diode D3 since the polarity during T2 across the L2 winding is such as to cause conduction through D3 to the load 3. The storage inductor L1 and its coupling coil L2 still only act as an inductor during the T2 period although the current is now crossed-over from the primary circuit (namely S1, L1(a) winding 7, and C) to the inductor secondary or coupling means including winding L2 diode D3 through the load terminal 4 to the load 3. In accord with another object of the present invention, the crossover from the primary circuit to the coupling means is relatively smooth since the current turned off in the primary circuit when S1 is turned off, although not having a path in the primary circuit, can immediately be switched to the coupling means and find a path to the load through L2 and D3.

The transfer of energy from the storage inductor L1 through the coupling diode D3 normally back-biases the rectifying diodes D1 and D2 except under low output voltage conditions where the voltage developed across winding 7 may be sufficient to drive a small current through D1. It should also be noted that during T2 the magnetizing current stored in winding 7 and L1 develops a potential tending to cause a current to freewheel through the series circuit C, D4, L1(a) and winding 7. This current is small as detected in FIGS. 2(c), 2(d), and 2(f).

Still referring to FIG. 1 and FIG. 2, the third period period T3 begins when control unit 11 turns on the current reversing switch S2 (S1 remaining off) which allows the storage capacitor C to deliver its energy to the load through the transformer primary winding 7 as coupled via the secondary winding 8 and diode D1. The discharging current through C finds a path through the transformer primary winding 7, the inductor winding L1(b) through switch S2 and back to C. In accordance with an object of the present invention, the inductor L1 (b) is in series with the switch S2 and with the transformer primary winding 7. Again the inductor L1(b) functions as a fault protector and as a filter in the manner previously discussed with reference to L1(a). In this manner, the present invention can be distinguished from the circuit shown in the aforementioned Hoffman et al. copending application which does not have an inductor winding in series with S2 and the reservoir supplying current when S2 is conducting. Furthermore, in the present invention, the switch S2 is not a short circuit across the storage inductor L1(a) and diode D4 so that no large freewheeling current is flowing through S2. This distinction can be seen by a comparison of the current through S2 as shown in FIG. 2(b) in each specification.

Still referring to FIG. 1 and FIG. 2, the final period T4 is analogous to the second period. T4 is commenced when the control unit 11 turns off switch S2 (S1 remaining off). Under these conditions, as before, the current through L1(b) is suddenly stopped by the turning off of S2 and that current is immediately switched from supplying the load via the transformer T to supplying the load via the coupling means L2 and D3. At the end of the T4 period, the source switch S1 is again opened to allow conduction from the source and the T1–T4 cycles are repeated in the manner above described.

The output voltage is controlled in the usual manner; that is, the duration of conduction of the power source 1, under the control of the switches S1 and S2 in turn controlled by control unit 11, governs the output voltage. More specifically, the ratio of the periods $$T1+T2+T3+T4$$

determines the ultimate output voltage. Since this type of control is well known, no further description herein will be given at this point.

By way of comparison, the current waveforms throughout the FIG. 1 circuit of the present invention as shown in the FIG. 2 waveforms are generally symmetrical as compared with the non-symmetrical waveforms in FIG. 2 of the aforementioned copending Hoffman et al. application.

Since it is desirable that the current to the load remain as uniform as possible, in a preferred embodiment the turns ratio of the inductor primary to secondary equals the turns ratio for the transformer primary to secondary. With that equal configuration, the current which crosses over from the load via the transformer primary loop to the load via the coupling means will be essentially constant giving the desired symmetrical operation and thereby aiding the smoothness of operation and the attendant good regulation of the circuit.

Any well known fault protector can be employed in the FIG. 1 circuit (and other ciruits of this invention) to turn off the circuit when a fault condition is detected. Typically, a current sensitive fault detector 20 is inserted in the line between S1 and L1(a). Additionally, a similar fault detector 21 is added to the capacitor C leg. Under normal operation, detectors 20 and 21 have no effect on the converter operation and can generally be ignored. When a fault current is detected, the detectors open to block the current.

The diode D4 in FIG. 1 of the present invention is not essential to the circuit operation in contra distinction to the diode D4 in FIG. 1 of the copending Hoffman et al. application. In the present invention D4 and also D5 function as clamps to insure that the voltages applied across the switches S2 and S1, respectively, do not exceed E. In this way, the switches are further protected in their operation from large voltage transients which might otherwise be produced. By way of example, at the commencement of T2, S1 is turned off but the current through L1(a) and winding 7 cannot be instantaneously turned off. Accordingly, a voltage is developed across those inductances which tends to maintain the current which was in existence during T1. Since without D4 there would be no path for that current in the primary circuit (the crossover to L2 not be instantaneous, although fast) D4 clamps that instantaneous voltage at a value of E or lower. Diode D5 acts in a similar manner when S2 is turned off thereby commencing period T4. Accordingly, the clamping diodes D4 and D5 provide a smoothness of operation which contributes to the well regulated output voltage desired.

In FIG. 4, a half-bridge circuit is shown which is similar in operation to the FIG. 1 circuit. The principal difference is the addition of the capacitor C1 which functions to conduct approximately one-half the current under balanced conditions, the other half being conducted by capacitor C. In the FIG. 1 circuit, capacitor C carried the whole current. As in FIG. 1, the FIG. 4 circuit applies, under balanced conditions, one-half E across the series transformer and inductor primary windings. Also, the transistor switches S1 and S2 as in FIG. 1 are subjected to a maximum voltage of approximately E. In FIG. 4, although not shown directly, a control unit is used and connected in the same manner as in FIG. 1. The terminated lines from the emitters and bases of S1 and S2 are connected, of course, to that control unit in the manner shown in FIG. 1.

Figure 5:
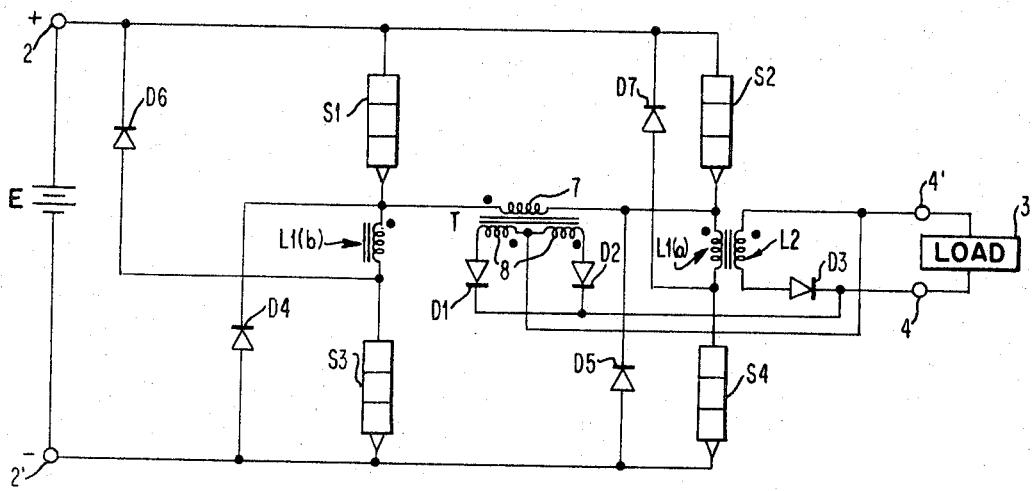
FIG. 5 is a full-bridge circuit in accordance with the present invention.

With reference to FIG. 5, a full bridge converter circuit is shown employing the present invention. As in the other embodiments, the primary inductor windings L1(a) and L1(b) are magnetically coupled to the inductor secondary winding L2. In operation, switches S1 and S4 are turned on and off together as are S2 and S3. During T1, S1 and S4 conduct with S2 and S3 turned off. During T2, all switches are off and current is supplied through the coupling means (L2 and D3) via the crossover from L1(a) in a manner analogous to that discussed in connection with FIG. 1. During T3, S2 and S3 conduct storing energy in L1(b) and that energy in L1(b) is transferred to the load via the crossover to the coupling means L2 and D3 during T4. The FIG. 5 circuit differs from the FIG. 1 and FIG. 4 circuits in that the full input voltage E is applied across the series transformer and inductor primary windings while only subjecting the switches S1, S2, S3, and S4 to the same voltage, E. It will be recalled that the FIG. 1 and FIG. 4 circuits subjected their two switches S1 and S2 to the full E input signal while delivering only one-half E across the series transformer and inductor primary windings.

Figure 6:
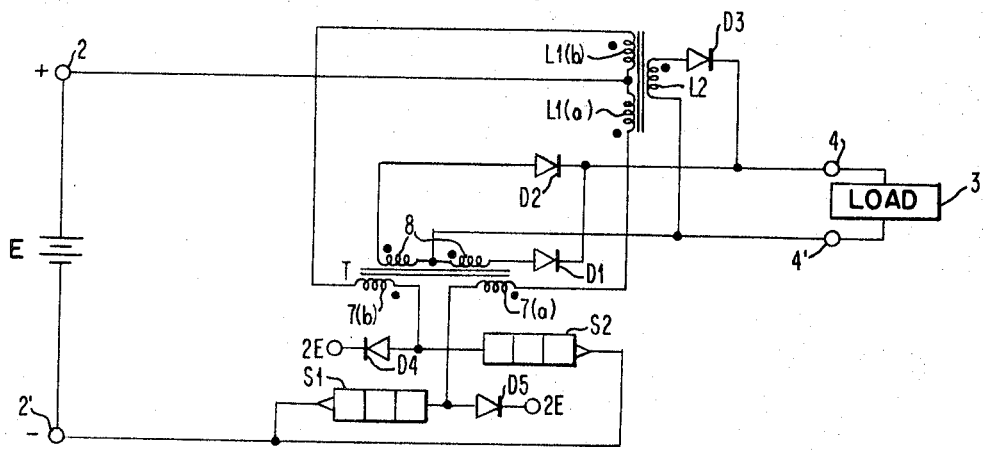
FIG. 6 is a parallel circuit employing a double inductor in accordance with the present invention.

With reference to FIG. 6, a parallel converter is shown in accordance with the present invention. This circuit differs slightly from the series circuit in that a transformer primary includes a split winding 7(a) and 7(b). Additionally the voltage across the switches S1 and S2 are clamped respectively to 2E via diodes D5 and D4. In his circuit arrangement, only two transistor switches are employed to impress a full E voltage across the series transformer and inductor primary windings. However, both of the transistors are subjected to a maximum voltage of 2E rather than E as in the full bridge embodiment employing four transistors.

By way of summary, it should be noted that the FIG. 4, FIG. 5, and FIG. 6 embodiments of the present invention all fulfill the objects of the present invention in the same manner as the FIG. 1 embodiment. Namely, each conducting transistor in all of the embodiments is always in series with an inductor and a transformer primary winding. Accordingly, each embodiment exhibits fault protection, smoother operation, and filtering in the manner heretofore described.

While the invention has been particularly shown and described with reference to preferred embodiments thereof, it will be understood by those skilled in the art that various changes in form and details may be made therein without departing from the spirit and scope of the invention.

What is claimed is:

1. In a voltage converter having a source switch, connected between a power source and a transformer primary winding, for gating under control of a control unit, current in one direction through the transformer primary winding; current reversing means, including a current reversing switch controlled by the control unit, for reversing the direction of current though the transformer primary winding; and rectifying diodes connected respectively from the legs of the transformer split secondary windings to a load terminal, the improvement comprising:

a storage reservoir having a first and second primary section, said first section connected in series between the source switch and the transformer primary winding and said second section connected in series with the current reversing switch and said primary winding, said storage reservoir operative to store energy during conduction of the power source, and coupling means, connecting said reservoir to said load terminal, to supply energy from said reservoir through said load terminal during periods when the power source is not conducting.

2. The improved voltage converter of claim 1 wherein said first and second sections of said storage reservoir are inductor primary windings and wherein said coupling means includes an inductor secondary winding magnetically coupled to said inductor primary windings.

3. The improved voltage converter of claim 2 wherein said coupling means further includes a diode connecting said inductor secondary windings to said load terminal.

4. The improved converter of claim 2 wherein the voltage turns ratio from each inductor primary winding to the inductor secondary winding is substantially the same as the turns ratio from the transformer primary to secondary.

5. The improved converter of claim 2 further including fault detector means for preventing fault current.

6. A hybrid half-bridge voltage converter for converting an input DC signal to a well-regulated output DC signal comprising:

(a) a forward current circuit including, in series,
a switch for gating the input DC signal to said forward current circuit, an inductor first primary winding, a transformer primary winding, and a storage capacitor;
(b) a current-reversing circuit including,
a current-reversing transistor in series with an inductor second primary winding both together shunted across said transformer primary winding and capacitor so as to conduct current in the discharge direction through said capacitor via said transformer primary winding;
(c) a transformer secondary including a split-secondary winding and rectifying diodes feeding a common load terminal;
(d) coupling means including,
an inductor secondary winding magnetically coupled to said inductor first and second primary windings, and
a coupling diode connected to deliver current from said inductor secondary winding to said load terminal;
(e) a control unit for sensing the DC output signal and controlling the "ON/OFF" time of said transistors as a function of the DC output voltage.

7. The hybrid half-bridge voltage converter of claim 6 further including means for clamping the voltage across said switches at a value not greater than the input DC signal.

8. A half-bridge voltage converter for converting an input DC signal to a well-regulated output DC signal comprising:
(a) a primary circuit including, in series,
a switch, for gating the input DC signal, in series with an inductor first primary winding, a transformer primary winding, and a first storage capacitor,
a second storage capacitor shunted across said switch, first primary winding, and transformer primary winding;
(b) a current-reversing circuit including a current-reversing transistor in series with an inductor second primary winding together shunted across said transformer primary winding and said first capacitor so as to conduct current in a discharge direction through said first capacitor via said transformer primary winding;
(c) a transformer secondary winding including a split secondary winding and rectifying diodes feeding a common load terminal;
(d) coupling means including,
an indutcor secondary winding magnetically coupled to said inductor first and second primary windings, and
a coupling diode connected to deliver current from said inductor secondary winding to said load terminal;
(e) a control unit for sensing the DC output signal and controlling the "ON/OFF" time of said transistors as a function of DC output voltage.

9. The half-bridge voltage converter of claim 8 further including means for clamping the voltage across said switches at not greater than a level equal to the input DC signal.

10. A full-bridge voltage converter for converting an input DC signal to a well-regulated output DC signal comprising:
(a) a forward current circuit including, in series,
a first switch for gating the input DC signal to said forward current circuit a transformer primary winding, an inductor first primary winding,
a transformer primary winding, and a second switch;
(b) a reverse current circuit in parallel with said forward current circuit including, in series,
a first current-reversing transistor for gating the input DC signal in the reversed direction through said transformer primary winding, said transformer primary winding, an inductor second primary winding, and a second current-reversing transistor;
(c) a transformer secondary including a split-secondary winding and rectifying diodes feeding a common load terminal;
(d) coupling means including,
an inductor secondary winding magnetically coupled to said inductor first and second primary windings, and a coupling diode connected to deliver current from said inductor secondary winding to said load terminal;
(e) a control unit for sensing the DC output signal and controlling the "ON/OFF" time of said switches as a function of the DC output voltage.

11. The full-bridge voltage converter of claim 10 further including means for clamping the voltage across said switches to a value not greater than the input signal.

12. A parallel voltage converter for converting an input DC signal to a well-regulated output DC signal comprising:
(a) a forward current circuit including, in series,
a first primary winding of a storage inductor connected to receive the input DC signal, a transformer first primary winding, and a switch;
(b) a reverse current circuit in parallel with said forward current circuit including, in series,
a second primary winding of said storage inductor, a transformer second primary winding, and a second switch;
(c) a transformer secondary including a split secondary winding magnetically coupled to said transformer first and second primary windings and rectifying diodes feeding a common load terminal;
(d) coupling means including,
an inductor secondary winding magnetically coupled to said first and second windings of said inductor, and a coupling diode connected to deliver current from said inductor secondary winding to said load terminal;
(e) a control unit for sensing the DC output signal and controlling the "ON/OFF" time of said switches as a function of the DC output voltage.

13. The parallel voltage converter of claim 12 further including means for clamping the voltage across said switches at two times the input DC signal.

References Cited

UNITED STATES PATENTS

| 1,593,357 | 7/1962 | Prince | 321—2 |
| 3,164,767 | 1/1965 | Morgan | 321—45 X |
| 3,303,405 | 2/1967 | Schwarz | 321—2 |
| 3,389,322 | 6/1968 | Smeltzer | 321—2 X |

JOHN F. COUCH, *Primary Examiner.*

W. H. BEHA, JR., *Assistant Examiner.*

U.S. Cl. X.R.

321—14, 18, 27